(12) United States Patent
Ambrose

(10) Patent No.: US 8,910,464 B2
(45) Date of Patent: Dec. 16, 2014

(54) LIFT FAN SPHERICAL THRUST VECTORING NOZZLE

(75) Inventor: David Ambrose, Quartz Hill, CA (US)

(73) Assignee: Lockheed Martin Corporation, Bethesda, MD (US)

( * ) Notice: Subject to any disclaimer, the term of this patent is extended or adjusted under 35 U.S.C. 154(b) by 824 days.

(21) Appl. No.: 13/094,771

(22) Filed: Apr. 26, 2011

(65) Prior Publication Data

US 2012/0275905 A1  Nov. 1, 2012

(51) Int. Cl.
| B63H 25/46 | (2006.01) |
| B63H 11/00 | (2006.01) |
| B64C 15/02 | (2006.01) |
| B05B 12/02 | (2006.01) |
| F02K 1/28 | (2006.01) |
| F02K 1/00 | (2006.01) |
| F02K 9/80 | (2006.01) |

(52) U.S. Cl.
CPC ............ *F02K 9/80* (2013.01); *F05D 2220/328* (2013.01); *F05D 2270/051* (2013.01)
USPC ............ 60/232; 60/228; 60/770; 239/265.35; 239/265.27; 239/265.19

(58) Field of Classification Search
USPC ............... 60/228, 230, 232, 770; 239/265.19, 239/265.27, 265.35, 265.37
See application file for complete search history.

(56) References Cited

U.S. PATENT DOCUMENTS

| 3,087,303 | A | * | 4/1963 | Heinze et al. ............ 239/265.25 |
| 5,115,996 | A | * | 5/1992 | Moller .......................... 244/12.5 |
| 5,323,606 | A | * | 6/1994 | Pesyna et al. ................... 60/232 |
| 5,383,332 | A | * | 1/1995 | Angel .............................. 60/228 |
| 5,478,016 | A | * | 12/1995 | Mansfield ................ 239/265.19 |
| 5,485,958 | A | * | 1/1996 | Nightingale ............ 239/265.19 |
| 6,318,668 | B1 | * | 11/2001 | Ulanoski et al. ............. 244/12.5 |
| 6,352,211 | B1 | * | 3/2002 | Bentley .................... 239/265.37 |
| 7,555,893 | B2 | * | 7/2009 | Okai et al. ...................... 60/228 |
| 7,581,381 | B2 | * | 9/2009 | Bryant ............................ 60/228 |

* cited by examiner

*Primary Examiner* — Ehud Gartenberg
*Assistant Examiner* — Karthik Subramanian
(74) *Attorney, Agent, or Firm* — McDermott Will & Emery LLP

(57) ABSTRACT

A thrust-vectoring nozzle is disclosed that includes a cylindrical case and a flow director. The flow director includes a cylindrical ring having a dimension to fit within the cylindrical case. The cylindrical ring has an inner wall and an outer wall and a plurality of fixed vanes are coupled to the inner wall of the ring. The flow director is configured to rotate about first and second mutually perpendicular axes.

18 Claims, 7 Drawing Sheets

LIFT FAN SPHERICAL THRUST VECTORING NOZZLE

STATEMENT REGARDING FEDERALLY SPONSORED RESEARCH OR DEVELOPMENT

Not applicable.

BACKGROUND

1. Field

The present disclosure generally relates to systems and methods of vectoring the exhaust of a fan, particularly for an aircraft lift engine.

2. Description of the Related Art

Aircraft that can hover, take off and land vertically are commonly referred to as Vertical Take-Off and Landing (VTOL) aircraft. This classification includes fixed-wing aircraft as well as helicopters and aircraft with tiltable powered rotors. Methods of vectoring the vertical lift airflow have included nozzles that can be swiveled in a single direction and the use of two sets of flat flapper vanes arranged 90 degrees to each other and located at the external nozzle.

The F-35 Lightning shown in FIG. 1 is a current aircraft that has VTOL capability. The propulsion system, shown in FIG. 2, provides vertical lifting force using a combination of vectored thrust from the turbine engine and a vertically oriented lift fan. The lift fan is located behind the cockpit in a bay with upper and lower clamshell doors. The engine exhausts through a three-bearing swivel nozzle that can deflect the thrust from horizontal to just forward of vertical. Roll control ducts extend out in each wing and are supplied with their thrust with air from the engine fan. Pitch control is effected via lift fan/engine thrust split. Yaw control is through yaw motion of the engine swivel nozzle. Roll control is provided by differentially opening and closing the apertures at the ends of the two roll control ducts.

The lift fan has a telescoping "D"-shaped nozzle to provide thrust deflection in the forward and aft directions, as shown in FIG. 3. The D-nozzle has fixed vanes at the exit aperture.

SUMMARY

The disclosed thrust vectoring nozzle provides a reliable and robust system for efficiently vectoring air flow at an angle to a central axis of the air flow in any radial direction from the central axis.

In certain embodiments, a thrust-vectoring nozzle is disclosed that includes a case comprising a cylindrical inner surface having a central axis, first and second mutually perpendicular axes that are both perpendicular to the central axis, and a circumferential direction around the central axis. A portion of the inner surface has a constant profile in the circumferential direction, wherein the profile comprises a portion of a circle. The nozzle also includes a flow director having an outer ring having a cylindrical outer surface having axial and circumferential directions. A portion of the outer surface has a constant profile in the circumferential direction, wherein the profile comprises a portion of a circle. The flow director is disposed within the case such that the circular portion of the outer surface of the flow director adjoins the circular portion of the inner surface of the case such that the flow director is able to rotate about the first and second axes.

In certain embodiments, a lift fan assembly is disclosed that includes a case having a cylindrical inner surface having axial and circumferential directions, wherein a portion of the inner surface has a constant profile in the circumferential direction, wherein the profile comprises a portion of a circle. A fan is disposed within the case and configured to cause air to flow along the axis of the case. The lift fan assembly also includes a flow director having an outer ring with a cylindrical outer surface having axial and circumferential directions. A portion of the outer surface has a constant profile in the circumferential direction, wherein the profile comprises a portion of a circle. The flow director is disposed within the case such that the circular portion of the outer surface of the flow director adjoins the circular portion of the inner surface of the case such that the flow director is able to rotate with respect to the case.

In certain embodiments, a method of vectoring the output air flow from an aircraft lift fan is disclosed. The method includes the steps of flowing the output air flow through a flow director that is disposed within a case that is fixed to the air vehicle, the case having a cylindrical inner surface with a central axis and a circumferential direction around the central axis wherein a portion of the inner surface has a constant profile in the circumferential direction, and the flow director having an outer ring with a cylindrical outer surface having axial and circumferential directions wherein a portion of the outer surface has a constant profile in the circumferential direction, wherein the flow director is disposed within the case such that the circular portion of the outer surface of the flow director adjoins the circular portion of the inner surface of the case such that the flow director is rotatable about at least one of first and second mutually perpendicular axes that are both perpendicular to the central axis of the case. The method also includes the step of rotating the flow director about the at least one of first and second axes.

BRIEF DESCRIPTION OF THE DRAWINGS

The accompanying drawings, which are included to provide further understanding and are incorporated in and constitute a part of this specification, illustrate disclosed embodiments and together with the description serve to explain the principles of the disclosed embodiments. In the drawings.

DETAILED DESCRIPTION

In the following detailed description, numerous specific details are set forth to provide a full understanding of the present disclosure. It will be apparent, however, to one ordinarily skilled in the art that embodiments of the present disclosure may be practiced without some of the specific details. In other instances, well-known structures and techniques have not been shown in detail so as not to obscure the disclosure.

Figure 1:
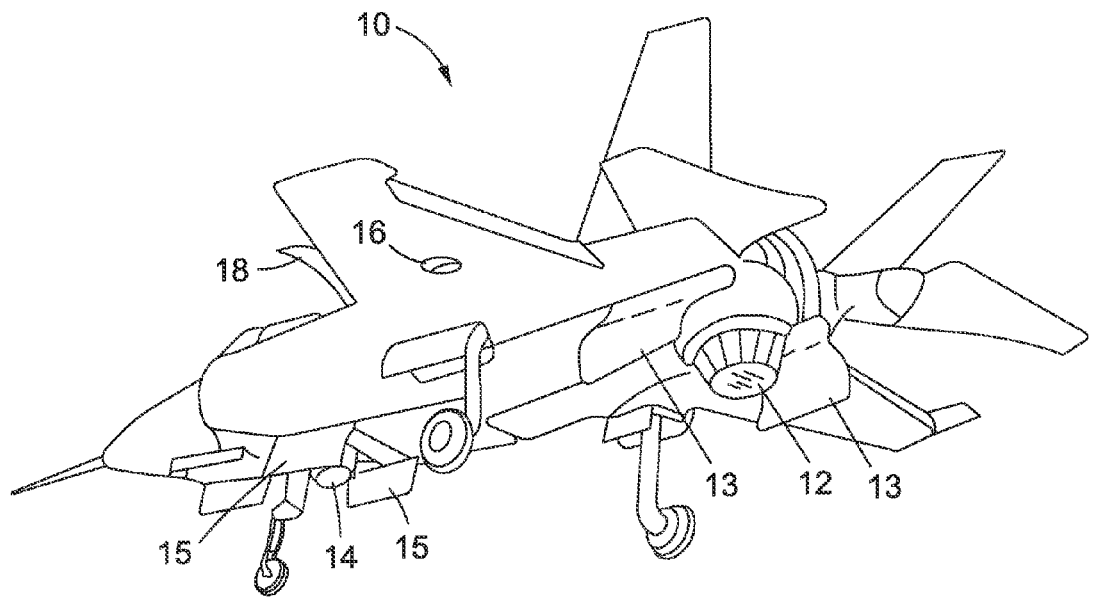
FIG. 1 depicts an F-35 aircraft in VTOL mode.

FIG. 1 depicts an F-35 aircraft 10 in VTOL mode. An aft set of clamshell doors 13 have opened and the exhaust nozzle 12 of the turbine engine 22 has swiveled to point vertically downward. Toward the front of the aircraft, lower clamshell doors 15 have opened exposing the exhaust nozzle 14 of the lift fan 24 (not visible in FIG. 1). Upper clamshell doors 18 have opened to allow air to flow into the intake of the lift fan 24. The left roll control nozzle 16 is visible in the underside of the left wing (the right nozzle is not visible in FIG. 1).

Figure 2:
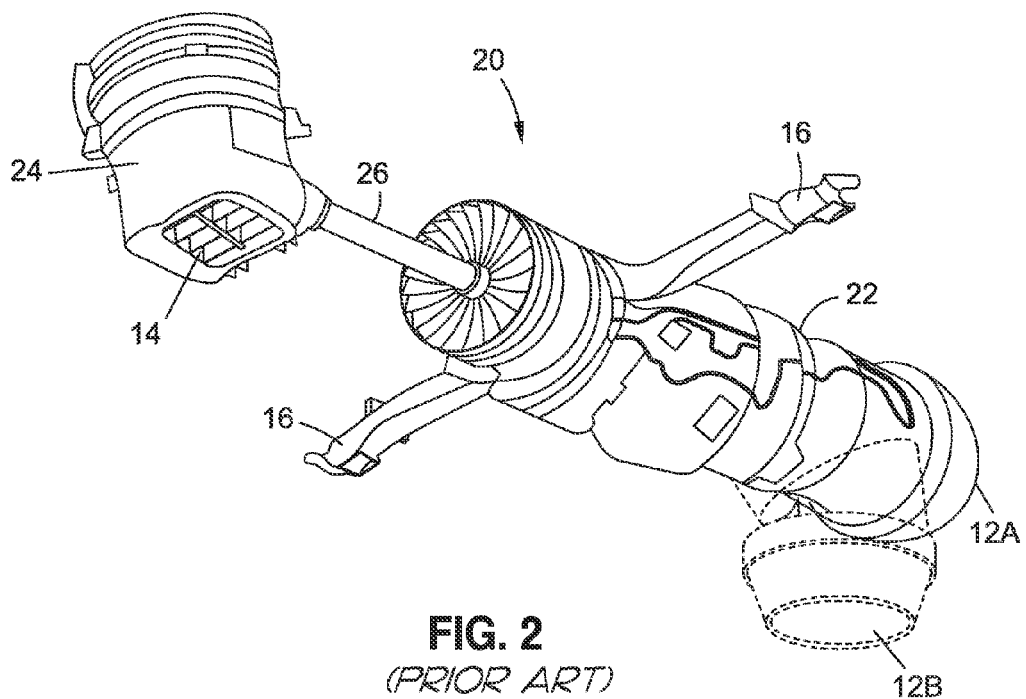
FIG. 2 is an illustration of propulsion system of the F-35 of FIG. 1.

FIG. 2 is an illustration of propulsion system 20 of the F-35 aircraft 10 of FIG. 1. The engine 22 provides exhaust thrust through nozzle 12, powers the vertical lift fan 24 through drive shaft 26, and provides air flow to the two roll control nozzles 16. The exhaust nozzle 12 has a horizontal flight position 12A and a vertical lift position 12B, which is the position shown in FIG. 1.

Figure 3:
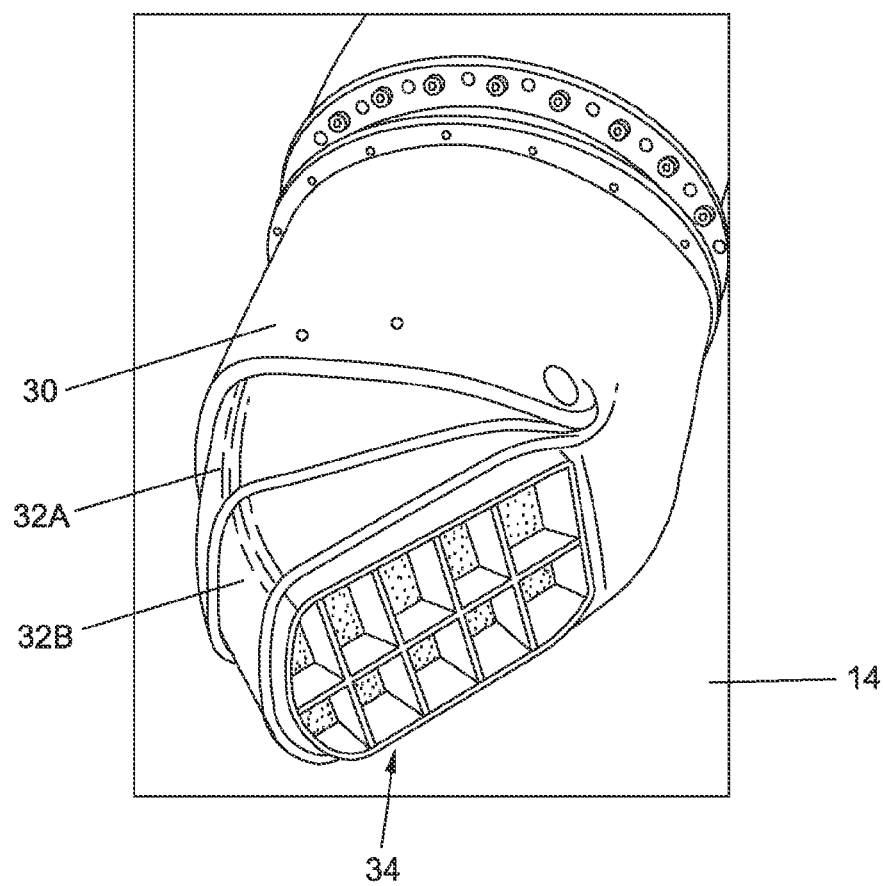
FIG. 3 shows the steerable D-nozzle at the exit of the lift fan duct of the F-35 of FIG. 1.

FIG. 3 shows the steerable D-nozzle 14 at the exit of the lift fan duct 30 of the F-35 10 of FIG. 1. The steerable nozzle 14 includes two telescoping section 32A and 32B that are hinged at the aft end. As the telescoping section 32A and 32B extend, the thrust is vectored from the vertical direction towards the rear, providing a component of forward thrust while still providing vertical thrust. The D-nozzle 14 has fixed rectilinear vanes 34 at the exit opening.

Figure 4A:
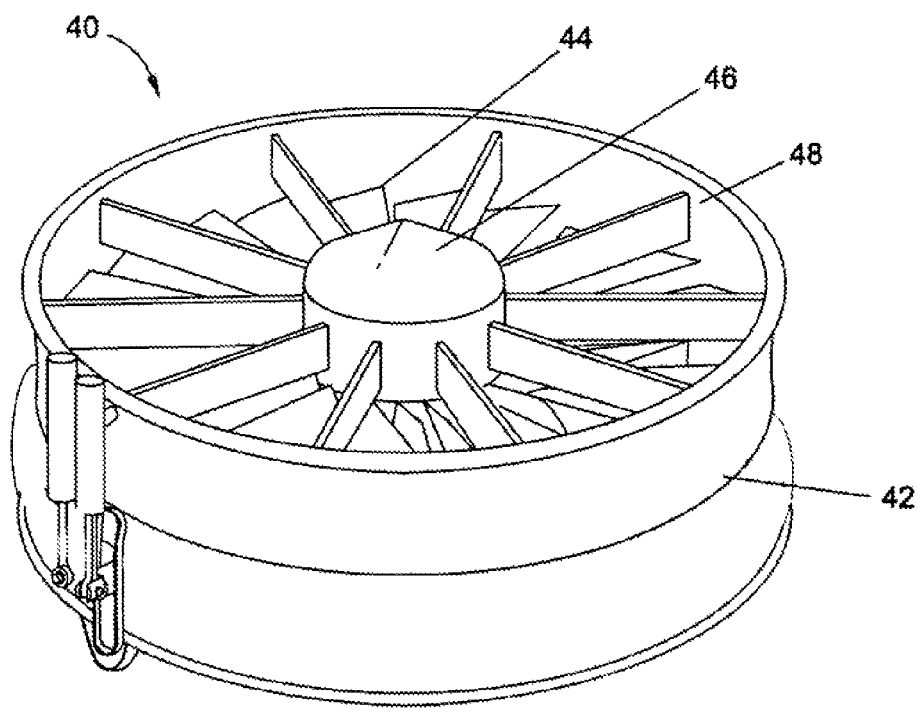
FIGS. 4A and 4B show a lift fan assembly according to certain aspects of this disclosure.
Figure 4B:
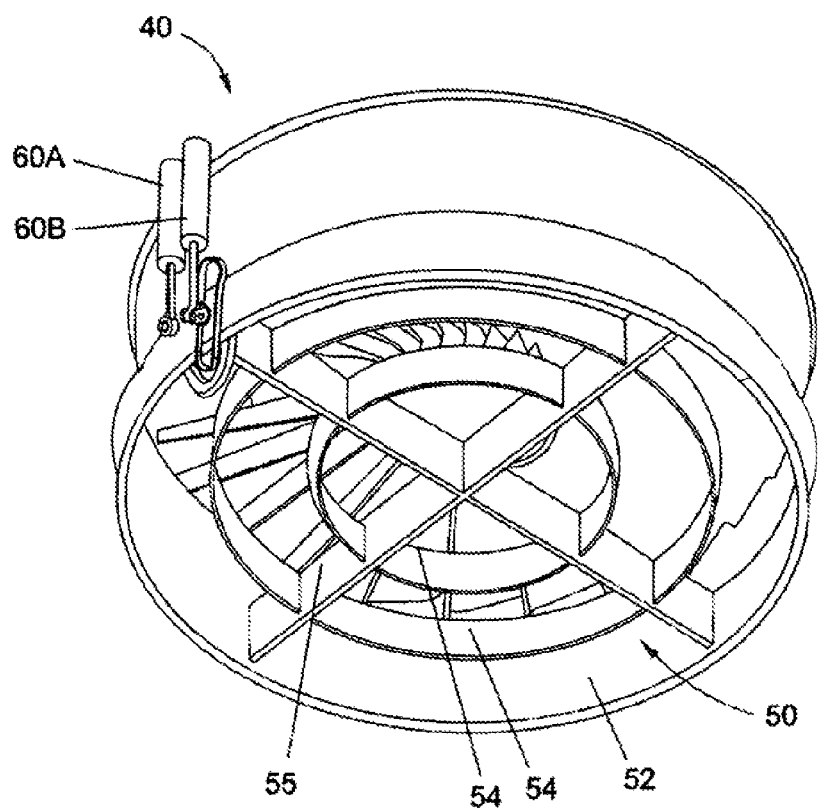

FIGS. 4A and 4B show a lift fan assembly 40 according to certain aspects of this disclosure. In this embodiment, the lift fan assembly 40 includes a cylindrical case 42 that supports a gear box 46 on fixed horizontal stator vanes 48. A multi-blade fan assembly 44 is located within the bore of the case 42 and is connected to the gearbox 46. The connection from a drive engine (not shown in FIG. 4A) to the gearbox 46 is omitted for clarity.

FIG. 4B is a view of the underside of the lift fan assembly 40 of FIG. 4A. A flow director 50 is shown located within the bore of the case 42 below, with respect to the direction of airflow, the fan assembly 44. The flow director 50, in this embodiment, includes a cylindrical outer ring 52, two inner rings 54 of vanes that are concentric with the outer ring 52, and four radial vanes 55 that attach the inner rings 54 to the inner wall of the cylindrical outer ring 52. In certain embodiments, there are more or fewer inner rings 54. In certain embodiments, there are more or fewer radial vanes 55. In certain embodiments, the flow director 50 has vanes arranged in a rectilinear pattern (not shown in FIG. 4B) inside the cylindrical outer ring 52. The interface between the flow director 50 and the case 42 is described in greater detail relative to FIG. 5. FIG. 4B also shows actuators 60A and 60B that control the orientation of the flow director 50 relative to the case 42, the operation of which is described in greater detail with respect to FIGS. 7A and 7B.

Figure 5:
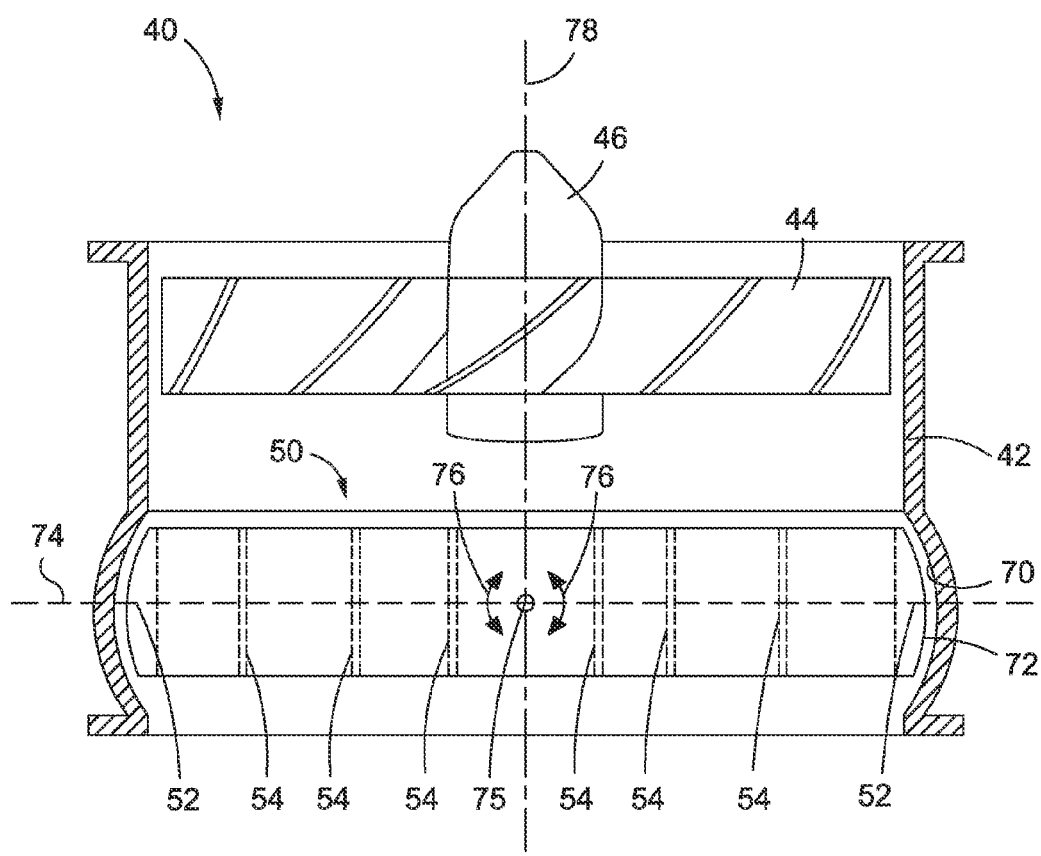
FIG. 5 depicts a cross-section of a lift fan assembly according to certain aspects of this disclosure.

FIG. 5 depicts a cross-section of a lift fan assembly 40 according to certain aspects of this disclosure. The case 42 is shown as a cross-section, whereas the other elements of the lift fan assembly are shown intact as exposed when the near portion of the case 42 is removed. In this embodiment, the fan assembly 44 is located at the upper end of the cylindrical case 42 and the airflow is downward. The fan assembly 44 is attached to and supported by the gearbox 46. The stator vanes 48 that support the gearbox 46 from the case 42 have been omitted for clarity. The flow director 50 is located near the lower end of the case 42. In certain embodiments, the case 42 is coupled to the frame of an aircraft (not shown) such that the central axis 78 is vertical. In certain embodiments, the case 42 is located within the frame of an aircraft such that the lower opening of the cylindrical case 42 constitutes an exit nozzle for air from the lift fan 44 leaving the aircraft.

The case 42 has the general shape of a cylinder with a central axis 78, which is an axis of symmetry for the cylindrical portion of the case 42 and for many of the components of the lift fan 40, and a circumferential direction around the central axis 78 in a plane that is perpendicular to central axis 78. The case has a portion 70 of the inner surface that, in this embodiment, is located near the lower end of the case 42. The portion 70 has a circular profile that is constant circumferentially, wherein the circular profile has a center at point 75.

The inner surface of the cylindrical outer ring 52 and the inner rings 54 of the flow director 50 are shown as dashed lines behind the outer wall of the outer ring 52. The flow director 50 has a plane 74 that passes horizontally, when the flow director 50 is positioned as shown in FIG. 5, through the center of the flow director 50. The flow director 50 has an axial direction aligned with the central axis 78, when the plane 74 is perpendicular to central axis 78, and a circumferential direction around the central axis 78 in plane 74. The outer ring 52 of the flow director 50 has an outer wall with a curved cylindrical outer surface 72 that has a portion with a circular profile that is constant circumferentially, wherein the circular profile of surface 72 also has a center at point 75. In the embodiment of FIG. 5, the portion with the circular profile includes the entire outer wall of the cylindrical outer ring 52.

The curves surfaces 70 and 72 of the case 42 and flow director 50, respectively, are proximate and concentric to each other and are both centered at point 75. The plane 74 is perpendicular to the tangent of surface 72 along the intersection of plane 74 and surface 72. The rotational capabilities of the spherical interface between curved surfaces 70 and 72 enables the flow director 50 to rotate simultaneously about mutually perpendicular axes that are both perpendicular to the central axis 78 of the case 42, as is discussed in greater detail with respect to FIG. 7. In certain embodiments, the curves surfaces 70 and 72 form elements of a spherical bearing. In certain embodiments, this spherical bearing also provides at least a portion of the mechanical support of the flow director 50 within the lift fan assembly 40, resisting the forces applied to the flow director by the air flow from the fan assembly 44 as well as gravitational force and the inertial forces created by the motion of the aircraft in which the lift fan assembly is mounted.

It can be seen that, in the embodiment of FIG. 5, the case 42 provides mechanical support to both the lift fan 44 and the flow director 50. In certain embodiments, the lift fan 44 is remotely located from the case 50 with ducting that conveys the air flow from the lift fan 44 to the case 42. In certain embodiments, the airflow is provided by a separate source, such as the engine 22 of FIG. 2, through ductwork between the engine 22 and the case 42. In embodiments wherein the airflow source is not co-located with the case 42, the case 42 and flow director 50 form a thrust-vectoring nozzle.

Figure 6:
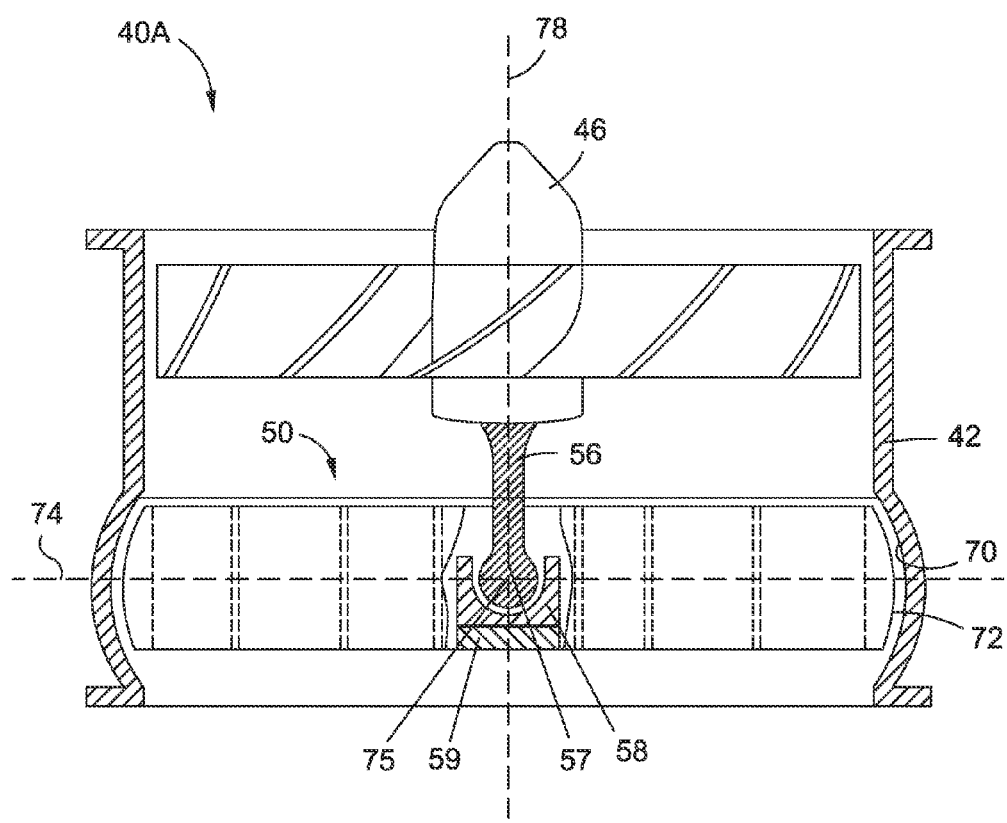
FIG. 6 depicts a cross-section of another embodiment of a lift fan assembly according to certain aspects of this disclosure.

FIG. 6 depicts a cross-section of another embodiment of a lift fan assembly 40A according to certain aspects of this disclosure. In this embodiment, the gearbox 46 has a fixed support 56 attached to the lower surface. At the end of the fixed support 56 is a fixed spherical support 57. A movable support 58 surrounds a portion of the fixed spherical support 57 and is rotationally movable relative to the fixed spherical support 57. The center of rotation of the movable support 58 about fixed spherical support 57 is centered at point 74 of FIG. 5. The flow director 50, in this embodiment, has an attachment element 59 that is fixedly coupled to the cylindrical ring 52, inner rings 54, and vanes 55. The attachment element 59 is coupled to movable support 58. The flow director 50 has been partially cut away in the center to show the details of elements 56, 57, 58, and 59, which are shown in cross-section to illustrate the spherical interface between the movable support 58 and the fixed spherical support 57.

In this configuration, the flow director 50 can rotate about point 75, located at the intersection of central axis 78 and plane 74, relative to the case 42 as in the embodiment of FIG. 5. The coupling of the flow director 50 to the case 42 through elements 59, 58, 57, and 56 provides, in certain embodiments, at least a portion of the mechanical support of the flow director 50 within the lift fan assembly 40. In certain embodiments, all of the mechanical support of the flow director 50 is provided though elements 59, 58, 57, and 56 and the interface between surfaces 70 and 72 is configured to minimize air leakage between the flow director 50 and the case 42.

Figure 7:
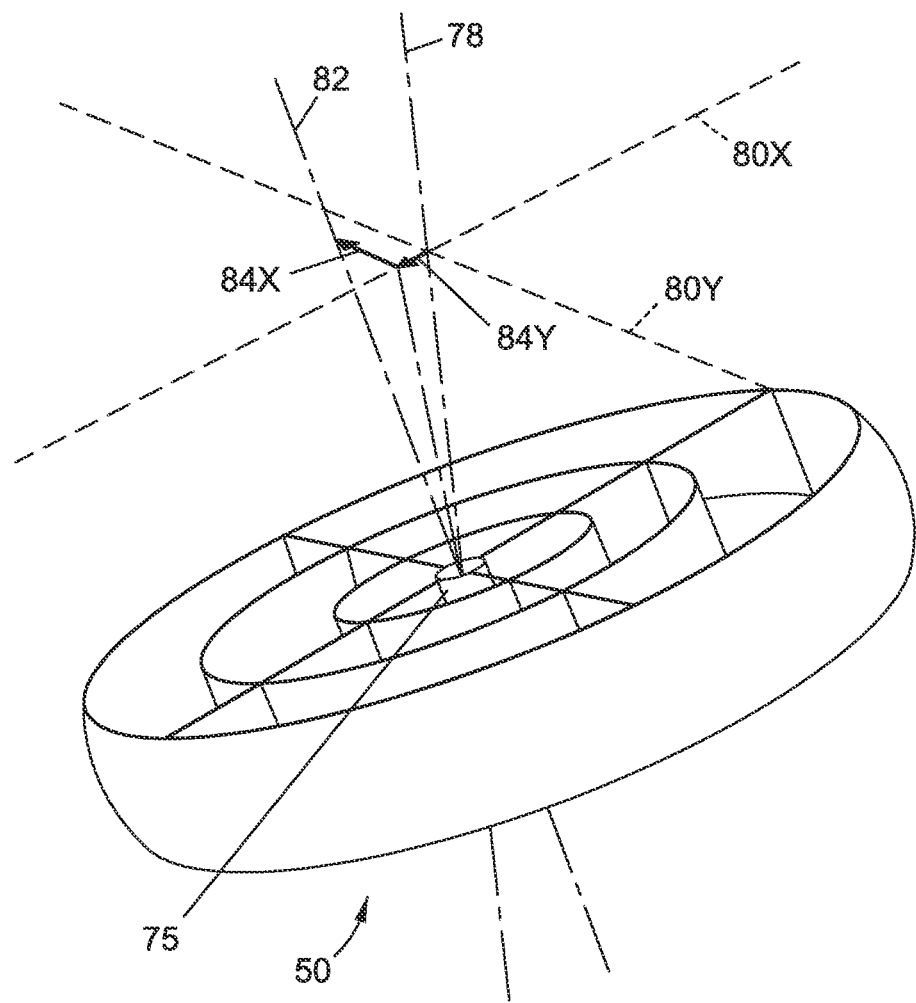
FIG. 7 illustrates the dual axis rotational capability of a flow director according to certain aspects of this disclosure.

FIG. 7 illustrates the dual-axis rotational capability of a flow director 50 according to certain aspects of this disclosure. The flow director 50 has an axis of symmetry 82 with which the vanes 54 and 55 are aligned. Central axis 78 from FIG. 6 is repeated in FIG. 7 to indicate the axis of the cylindrical case (not shown in FIG. 7). When flow director axis of symmetry 82 is aligned with central axis 78, there is no deflection of the air flowing from the lift fan (not shown in FIG. 7). The two axes 80X and 80Y are perpendicular to each other as well as perpendicular to the central axis 78. The spherical bearing arrangements of FIG. 5 or 6 allow the flow director 50 to rotate about at least either or both of axes 80X and 80Y. The flow director 50 rotates about point 75. In the embodiment of FIG. 7, the flow director is angularly displaced about both axes 80X and 80Y, wherein the angular displacement about axis 80X is angle 84X and the angular displacement about axis 80Y is angle 84Y. In can be seen that the axis of symmetry 84 can be pointed in any direction about central axis 78 through the appropriate combinations of angular displacements about axes 80X and 80Y. In certain embodiments, the flow director 50 is capable of being rotated up to at least 10 degrees from the central axis 78. In certain embodiments, the flow director 50 is capable of being rotated up to at least 3 degrees from the central axis 78.

Figure 8A:
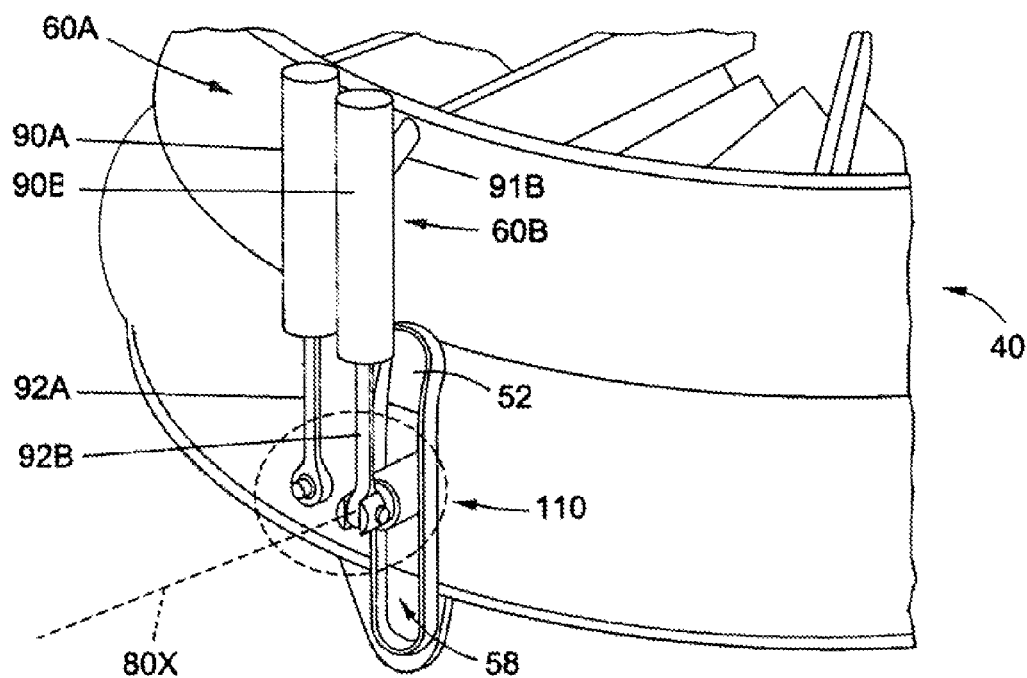
FIGS. 8A and 8B depict an embodiment of the actuators that rotate the flow director according to certain aspects of this disclosure.
Figure 8B:
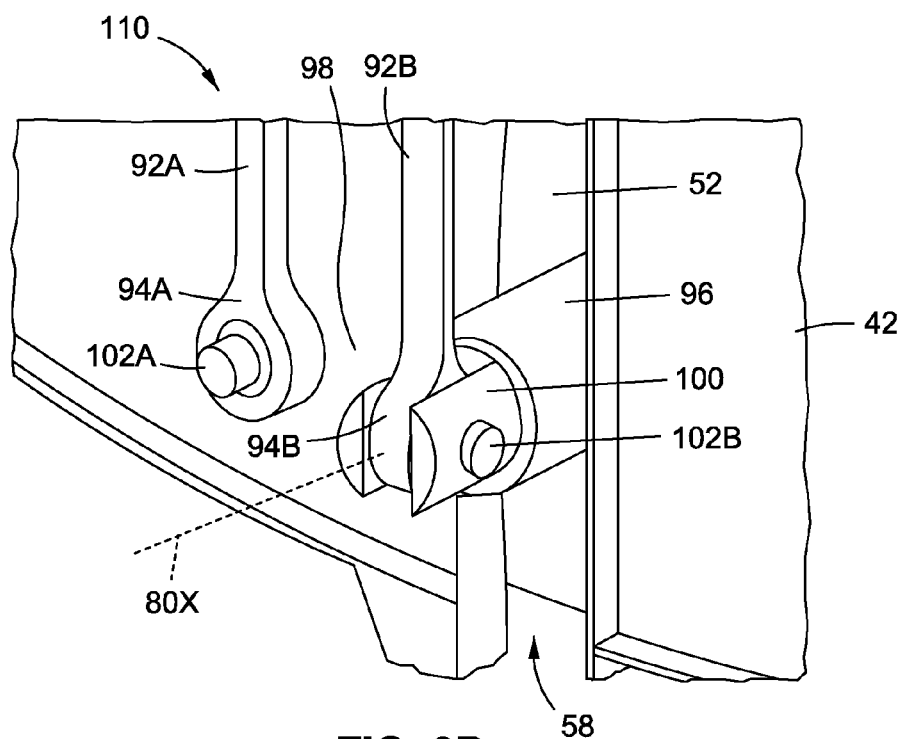

FIGS. 8A and 8B depict an embodiment of the actuators 60A and 60B that rotate the flow director 50 according to certain aspects of this disclosure. In this embodiment, actuators 60A and 60B are hydraulic actuators that extend rods 92A, 92B from cylinders 90A, 90B. The rods 92A, 92B are coupled to the cylindrical ring of the flow director 50 in a manner that is discussed in more detail with respect to FIG. 8B. The cylinders 90A, 90B are rotatably coupled to the case 42 of the lift fan assembly 40 at, in this embodiment, pivot points 91A (not visible in FIG. 8A) and 91B such that the cylinders 90A, 90B can pivot with respect to the case 42. There is a slot 58 in the case 42 that is discussed in more detail with respect to FIG. 8B. The axes 80X and 80Y (not visible in FIG. 8A) are arranged with respect to the slot 56 such that axis 80X is centered on slot 56.

FIG. 8B is an enlarged view of the area of FIG. 8A that is encircled by the broken line 110. In this embodiment, a post 96 is fixed to the outer ring 52 of the flow director 50 and protrudes through slot 58. As the flow director 50 rotates about axis 80Y, which is perpendicular to axis 80X, the post 96 will move up and down in slot 56. Rod 92B has a rod end 94B with a pivot pin 102B that couples to a pivot 100 that is rotatably coupled to post 96. As the flow director 50 rotates about axis 80Y and the post 96 moves up or down in slot 56, rod 92B rotates with respect to pivot 100 about pivot pin 102B. Conversely, actuation of actuator 60B causes flow director 50 to rotate about axis 80Y.

An arm 98 is fixed to the post 96 and is parallel to axis 80Y when the axis of symmetry 82 (not shown) of flow director 50 is aligned with central axis 78 (not shown). Rod 92A has a rod end 94A with a pivot pin 102A that couples to the arm 98. When the flow director 50 rotates about axis 80X, pivot pin 102A follows a circular path about axis 80X. Rod 92A retains its orientation as the arm pivots about pivot pin 102A, although rod 92A will extend and retract and have some slight angular motion as pivot pin 102A follows its circular path. Conversely, actuation of actuator 60A causes flow director 50 to rotate about axis 80X without displacing post 96.

It can be seen that the coupling of actuators 60A, 60B to the flow director 50 through post 96 and arm 98 enables the actuators 60A and 60B to work in concert to control the angular position of the flow director 50 with respect to axes 80X and 80Y. For example, in this embodiment, common motion of actuators 60A, 60B produces rotation of flow director 50 solely about axis 80Y. Motion of actuator 60A while actuator 60B is stationary produces rotation of the flow director solely about axis 80X. Combinations of rotations of the flow director 50 about axes 80X and 80Y are produced by the appropriate extensions or retractions of rods 92A and 92B.

It can be seen that the disclosed embodiments of a thrust-vectoring nozzle provide a reliable and effective apparatus to deflect an air flow in two perpendicular directions. For embodiments where the airflow is a downwardly directed airflow from a VTOL aircraft, this vectoring provides control force to stabilize the aircraft during landing, takeoff, and hovering. In certain embodiments, the thrust-vectoring nozzle is integrated with a lift fan to produce a lift fan assembly.

The previous description is provided to enable any person skilled in the art to practice the various aspects described herein. While the foregoing has described what are considered to be the best mode and/or other examples, it is understood that various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the terms "a set" and "some" refer to one or more. Pronouns in the masculine (e.g., his) include the feminine and neuter gender (e.g., her and its) and vice versa. Headings and subheadings, if any, are used for convenience only and do not limit the invention.

It is understood that the specific order or hierarchy of steps in the processes disclosed is an illustration of exemplary approaches. Based upon design preferences, it is understood that the specific order or hierarchy of steps in the processes may be rearranged. Some of the steps may be performed simultaneously. The accompanying method claims present elements of the various steps in a sample order, and are not meant to be limited to the specific order or hierarchy presented.

Terms such as "top," "bottom," "front," "rear" and the like as used in this disclosure should be understood as referring to an arbitrary frame of reference, rather than to the ordinary gravitational frame of reference. Thus, a top surface, a bottom surface, a front surface, and a rear surface may extend upwardly, downwardly, diagonally, or horizontally in a gravitational frame of reference.

"Inertial space" is defined as the ideal frame of reference that is stationary across the frequency range of interest. In particular, an inertial reference does not have vibratory or oscillatory motion. An "absolute" position in inertial space is considered to be referenced to a fixed reference in that inertial space.

A phrase such as an "aspect" does not imply that such aspect is essential to the subject technology or that such aspect applies to all configurations of the subject technology. A disclosure relating to an aspect may apply to all configurations, or one or more configurations. A phrase such as an aspect may refer to one or more aspects and vice versa. A phrase such as an "embodiment" does not imply that such embodiment is essential to the subject technology or that such embodiment applies to all configurations of the subject technology. A disclosure relating to an embodiment may apply to all embodiments, or one or more embodiments. A phrase such an embodiment may refer to one or more embodiments and vice versa.

The word "exemplary" is used herein to mean "serving as an example or illustration." Any aspect or design described herein as "exemplary" is not necessarily to be construed as preferred or advantageous over other aspects or designs.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112, sixth paragraph, unless the element is expressly recited using the phrase "means for" or, in the case of a method claim, the element is recited using the phrase "step for." Furthermore, to the extent that the term "include," "have," or the like is used in the description or the claims, such term is intended to be inclusive in a manner similar to the term "comprise" as "comprise" is interpreted when employed as a transitional word in a claim.

What is claimed is:

1. A thrust-vectoring nozzle comprising:
a cylindrical case through which air flows; and
a flow director disposed within the case, the flow director comprising:
a cylindrical ring having a dimension to fit within the cylindrical case, the cylindrical ring having an inner wall and an outer wall; and
a plurality of fixed vanes coupled to the inner wall of the ring, the plurality of fixed vanes extending radially inward from the inner wall of the ring;
wherein the flow director is configured to rotate about first and second mutually perpendicular axes.

2. The nozzle of claim 1, wherein a circular portion of an inner surface of the cylindrical case and a circular portion of the outer wall of the flow director are proximate to each other.

3. The nozzle of claim 2, wherein the circular portion of the inner surface of the cylindrical case and the circular portion of the outer wall of the flow director form a spherical bearing that at least partially supports the flow director.

4. The nozzle of claim 2, wherein:
the nozzle further comprises a center support element coupled to the cylindrical case and having a fixed portion and a movable portion, the movable portion able to rotate with respect to the fixed portion;
the flow director further comprises an attachment element coupled to the cylindrical ring;
the attachment element of the flow director is coupled to the movable portion of the center support; and
the center support at least partially supports the flow director.

5. The nozzle of claim 1, further comprising at least two actuators both coupled to the cylindrical case and to the cylindrical ring of the flow director, the actuators configured to position the flow director at selected first and second angles about the first and second axes, respectively.

6. The nozzle of claim 1, wherein the flow director has an open flow area of at least 0.3 square meters.

7. The nozzle of claim 6, wherein the flow director has an open flow area of at least 1 square meter.

8. The nozzle of claim 1, wherein a portion of the vanes of the flow director are arranged in at least one inner ring that is concentric with the cylindrical ring.

9. A lift fan assembly comprising:
a cylindrical case;
a flow director disposed within the case, the flow director comprising:
a cylindrical ring having a dimension to fit within the cylindrical case, the cylindrical ring having an inner wall and an outer wall; and
a plurality of fixed vanes coupled to the inner wall of the ring, the plurality of fixed vanes extending radially inward from the inner wall of the ring;
a fan disposed within the cylindrical case and configured to cause air to flow through the flow director; and
wherein the flow director is configured to rotate about first and second mutually perpendicular axes.

10. The nozzle of claim 9, wherein a circular portion of an inner surface of the cylindrical case and a circular portion of the outer wall of the flow director are proximate to each other.

11. The lift fan assembly of claim 10, wherein the circular portion of the inner surface of the cylindrical case and the circular portion of the outer wall of the flow director form a spherical bearing that at least partially supports the flow director.

12. The lift fan assembly of claim 10, wherein:
the nozzle further comprises a center support element coupled to the cylindrical case and having a fixed portion and a movable portion, the movable portion able to rotate with respect to the fixed portion;
the flow director comprises an attachment element coupled to the cylindrical ring;
the attachment element of the flow director is coupled to the movable portion of the center support; and
the center support at least partially supports the flow director.

13. The lift fan assembly of claim 11, further comprising at least two actuators both coupled to the cylindrical case and to the cylindrical ring of the flow director, the actuators configured to position the flow director at selected first and second angles about the first and second axes, respectively.

14. The lift fan assembly of claim 11, wherein the flow director has an open flow area of at least 0.3 square meters.

15. The lift fan assembly of claim 14, wherein the flow director has an open flow area of at least 1 square meter.

16. The lift fan assembly of claim 9, wherein a portion of the vanes of the flow director are arranged in at least one inner ring that is concentric with the cylindrical ring.

17. A method of vectoring the output air flow from an aircraft lift fan, the method comprising the steps of:
flowing the output air flow through a flow director that comprises a plurality of fixed vanes, the plurality of fixed vanes extending radially inward from an inner wall of a ring having a dimension to fit within a case, and that is disposed within a case that is fixed to the aircraft; and
rotating the flow director about first and second mutually perpendicular axes.

18. The method of claim 17, wherein the flow director is disposed at an exit nozzle of the case.

* * * * *